(12) United States Patent
Mannes et al.

(10) Patent No.: US 6,615,988 B2
(45) Date of Patent: Sep. 9, 2003

(54) CONNECTION DEVICE FOR CONNECTING A HYDROCYCLONE

(75) Inventors: Wolfgang Mannes, Ravensburg-Bavendorf (DE); Rolf Hartmann, Weingarten (DE)

(73) Assignee: Voith Paper Patent GmbH, Heidenheim (DE)

(*) Notice: Subject to any disclaimer, the term of this patent is extended or adjusted under 35 U.S.C. 154(b) by 0 days.

(21) Appl. No.: 09/928,994

(22) Filed: Aug. 15, 2001

(65) Prior Publication Data

US 2002/0053536 A1 May 9, 2002

(30) Foreign Application Priority Data

Aug. 16, 2000 (DE) .................................. 200 14 329 U
Aug. 16, 2000 (DE) .................................. 200 14 330 U

(51) Int. Cl.[7] .............................. B04C 5/28; B01D 21/26
(52) U.S. Cl. .................................... 209/728; 210/512.2
(58) Field of Search .............................. 209/710, 711, 209/725, 728, 729; 210/512.1, 512.2

(56) References Cited

U.S. PATENT DOCUMENTS

| | | | |
|---|---|---|---|
| 3,085,382 A | | 4/1963 | Finney, Jr. et al. ............ 55/449 |
| 4,146,469 A | * | 3/1979 | Kaiser et al. ................ 209/728 |
| 4,572,787 A | * | 2/1986 | Robinson ................ 210/512.2 |
| 4,655,923 A | * | 4/1987 | Leone .................... 209/728 X |
| 5,096,587 A | * | 3/1992 | Charette ................ 209/728 X |
| 5,447,632 A | | 9/1995 | Andersson .............. 209/728 X |

FOREIGN PATENT DOCUMENTS

WO 91/16988 * 11/1991 .................. 209/728

* cited by examiner

Primary Examiner—Tuan N. Nguyen
(74) Attorney, Agent, or Firm—Greenblum & Bernstein, P.L.C.

(57) ABSTRACT

Connection device and process for connecting a hydrocyclone to a distribution and collection device, in which distribution and collection device includes connection openings for addition or removal of liquid during operation of the hydrocyclone. Connection device includes a pipe piece having an insertion side structured and arranged to be insertable through one of the connection openings into distribution and collection device. The insertion side includes a circumferential groove and a radial protrusion positioned adjacent circumferential groove, and radial protrusion has an outer diameter smaller than an inner diameter of the one connection opening and is structured to remain within distribution and collection device. A ring-shaped seal, structured and arranged to extend from exterior of distribution and collection device to interior of distribution and collection device, has an outer diameter greater that inner diameter of the one connection opening, and ring-shaped seal is positionable in a tensioned state in circumferential groove.

25 Claims, 5 Drawing Sheets

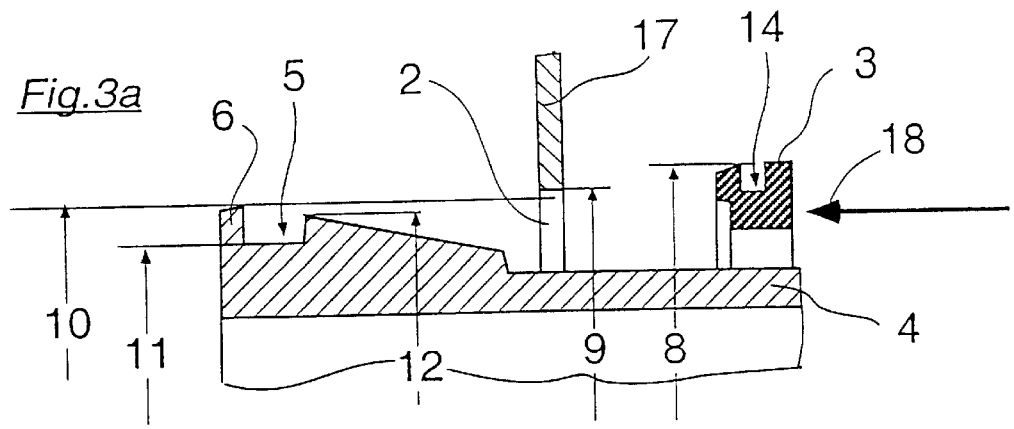
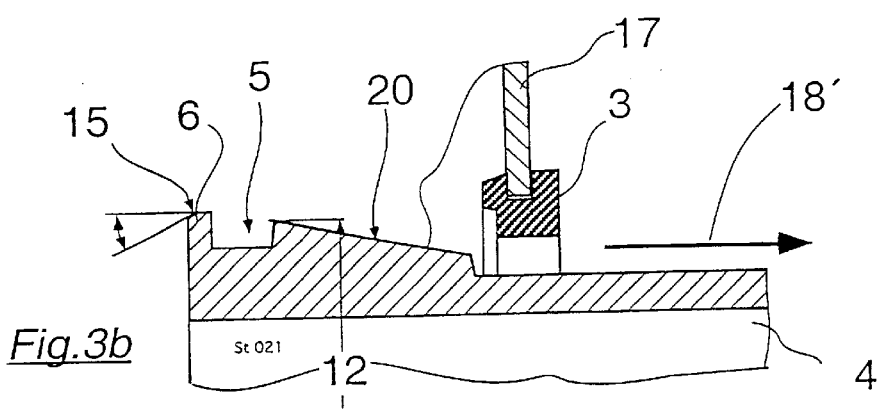
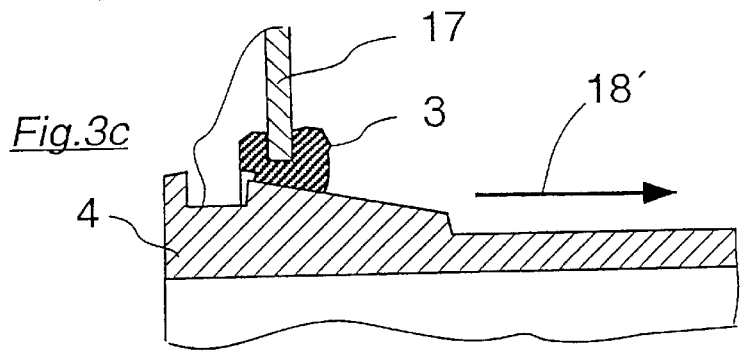
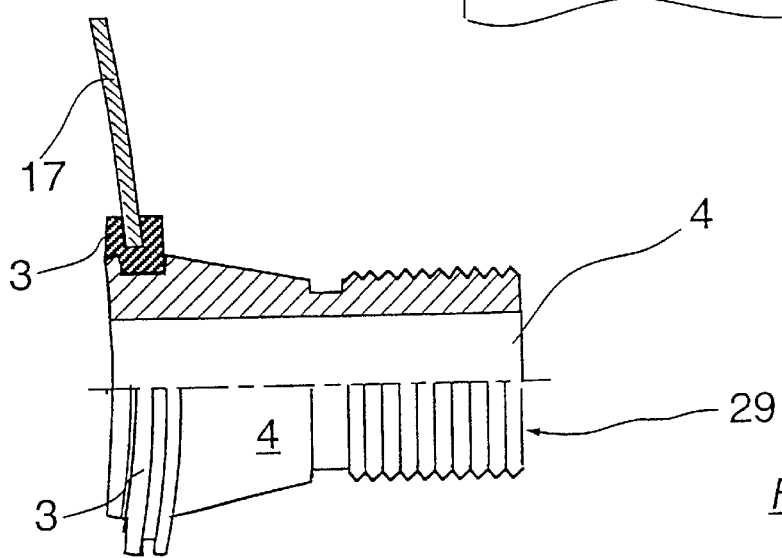

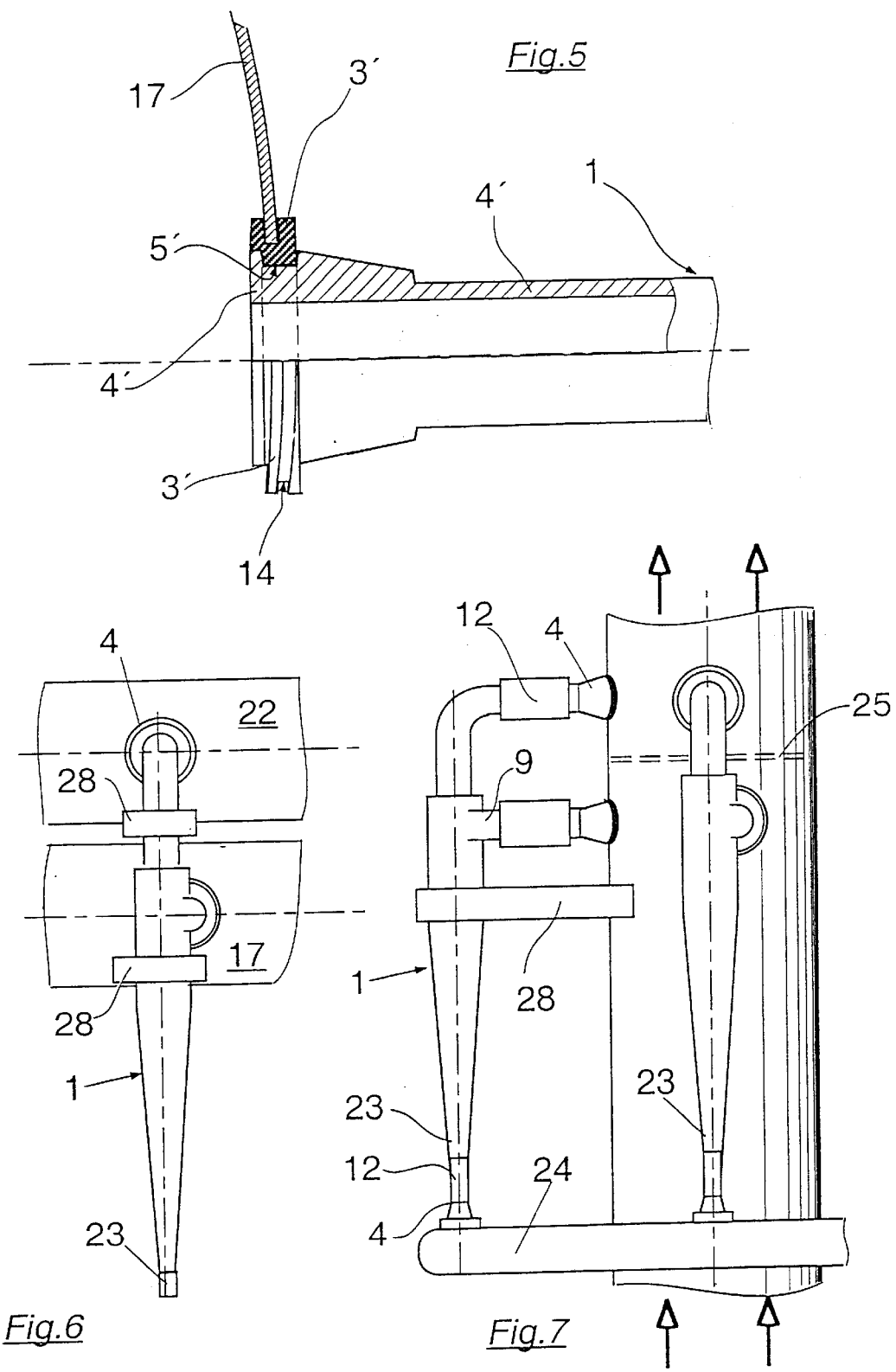

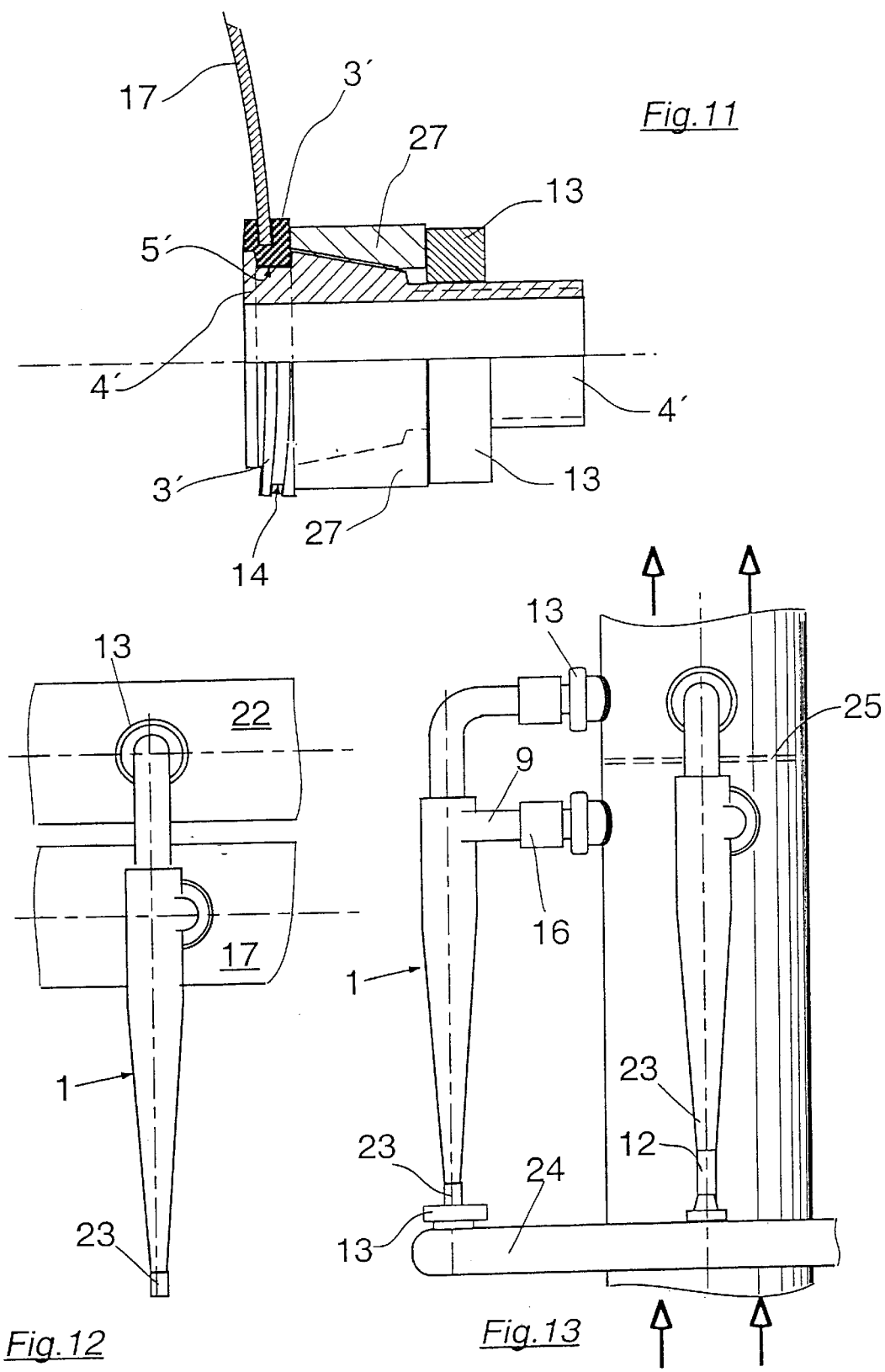

CONNECTION DEVICE FOR CONNECTING A HYDROCYCLONE

CROSS-REFERENCE TO RELATED APPLICATIONS

The present application claims priority under 35 U.S.C. §119 of German Patent Application Nos. 200 14 330.1 and 200 14 329.8, both filed on Aug. 16, 2000, the disclosures of which are expressly incorporated by reference herein in their entireties.

BACKGROUND OF THE INVENTION

1. Field of the Invention

The invention relates to a connection device for connecting a hydrocyclone to a distribution and collection device for addition or removal of liquids, in which the distribution and collection device is provided with connection openings through which addition or removal of the liquid occurs during operation of the hydrocyclone.

2. Discussion of Background Information

It is known for hydrocyclones to be used for the purpose of fractioning liquids containing materials with different sinking behavior using strong centrifugal forces. Thus, it is possible, for example, to concentrate contaminants contained in a fibrous stock suspension as is used for producing paper and to remove them from the hydrocyclone by way of a rejects connection. The fraction that has been cleared of contaminants, i.e., the accepted stock, is then brought through the accepted stock connection and further used. However, if the hydrocyclone assembly is connected differently, undesired light particles or air could be removed as well. These processes are known per se, like the fact that a good effect is guaranteed only if the hydrocyclones do not exceed a certain size. Therefore, in a hydrocyclone assembly that is structured for larger throughput amounts, a plurality—often even a multitude—of hydrocyclones is needed. These hydrocyclones are then flowed through parallel to the liquid to be cleaned, which means that the liquid stream must be divided into a plurality of smaller partial streams. For this purpose, a distribution and collection device is used to which the hydrocyclones are connected by way of appropriate connecting units. The distribution and collection device can also contain connections to the dispenser of rinsing water into the hydrocyclones.

A particular requirement for connecting units of this type is their simplicity, so that they may be produced and used in a cost-effective manner. The hydrocyclones themselves should be easy to mount and easy to exchange for maintenance purposes.

Hydraulic disturbances and collections of solid material or the like should be prevented at the connection points. The fulfillment of all these requirements is not attained in a satisfactory manner by the assemblies that have been available up to now.

SUMMARY OF THE INVENTION

The present invention provides a connection device for connecting the hydrocyclones with simple devices in such a way that it is easy and fast to mount and a secure mounting is guaranteed, even in the case of overpressure. The hydrocyclones should be simple to attach and remove.

According to the instant invention, the connection device includes a pipe piece having an insertion side with a circumferential groove and a radial protrusion adjacent to the groove. An outer diameter of which protrusion is smaller than an inner diameter of the connection opening, and the protrusion is positioned within the distribution and collection device in the assembled state. A ring-shaped seal, which extends from an exterior to an interior of the distribution and collection device, has an outer diameter greater that the inner diameter of the connection opening and is pretensed (stressed) in the groove of the pipe piece in the assembled state.

The connection device according to the invention includes relatively simple parts. They can normally be produced in serial production and are often made of plastic or rubber. The connection to the collection and distribution device can be performed without any major problems, even on site, if desired. One important advantage is that the assembly, i.e., attaching the connection device, can occur from the outside onto the material pipes. No welding or soldering apparatus is needed. Deviations in size of the connection openings in the distribution and collection devices are compensated to a certain degree. The individual assembly procedure is also disclosed.

The present invention is directed to a connection device for connecting a hydrocyclone to a distribution and collection device for addition or removal of liquids, in which the distribution and collection device includes connection openings through which the addition or removal of the liquid occurs during operation of the hydrocyclone. The connection device includes a pipe piece having an insertion side structured and arranged to be insertable through one of the connection openings into the distribution and collection device. The insertion side includes a circumferential groove and a radial protrusion positioned adjacent the circumferential groove, and the radial protrusion has an outer diameter smaller than an inner diameter of the one connection opening and is structured to remain within the distribution and collection device. A ring-shaped seal, structured and arranged to extend from an exterior of the distribution and collection device to an interior of the distribution and collection device, has an outer diameter greater that the inner diameter of the one connection opening, and the ring-shaped seal is positionable in a tensioned state in the circumferential groove.

According to a feature of the present invention, the pipe piece can include a conical section whose largest diameter is adjacent to the circumferential groove. The largest diameter of the conical section may be at least about 4 mm greater than a diameter of the circumferential groove.

According to another feature of the invention, the outer diameter of the radial protrusion can be at least about 6 mm larger than a diameter of the circumferential groove. Further, the outer diameter of the radial protrusion may be a maximum of about 2 mm smaller than the inner diameter of the one connection opening. Still further, the radial protrusion can include a beveled surface arranged for facilitating insertion into the one connection opening.

Further, a pressure component may be positioned outside of the distribution and collection device and can be structured and arranged exert a force to axially compress the ring-shaped seal. A tension device may be arranged to exert an axial force on the pressure component, whereby a constant force is applied between the radial protrusion and the pressure component which axially compresses the seal. The tension device may include a forcing nut, and the pipe piece can include a thread, such that as the forcing nut is screwably tightened against the pressure component, axial compression of the ring-shaped seal occurs. The pressure component may be formed as a part of the forcing nut.

According to still another feature of the present invention, the pipe piece can be a part of the hydrocyclone to be attached. Alternatively, the pipe piece may include a tube nipple.

In accordance with a further feature of the instant invention, the pressure component may be formed as a part of the forcing nut.

The connection device of the instant invention can also include a clamp, and the pipe piece may include a clamp groove arranged to receive the clamp. The clamp can be insertable within the clamp groove and can be arranged to one of directly or indirectly apply an axial force onto the ring-shaped seal.

Moreover, the pipe piece can be connectable to a connection support of the hydrocyclone to be connected via a screw connection. A sleeve having a left-hand and a right-hand thread may provide a rotatably fixable and removable screw connection between the pipe piece and the connection support of the hydrocyclone to be connected.

Further, the at one connection opening can have an uneven edge, the circumferential groove in the pipe piece can be evenly formed, and the ring-shaped seal may be structured to compensate for deviations between the evenly formed groove and the uneven edge of the one connection opening. The ring-shaped seal may include an elastic deformable material, whereby the elastic deformable material of the ring-shaped seal provides the compensation for deviations.

The present invention is directed to a process for connecting a distribution and collection device to a hydrocyclone, in which the distribution and collection device includes a number of connection openings. The process includes inserting an insertion side of a pipe piece through one of the connection openings into the distribution and collection device, such that the insertion side of the pipe piece includes a circumferential groove and a radial protrusion, positioned adjacent the circumferential groove, that has an outer diameter smaller than an inner diameter of the one connection opening. The process also includes positioning a ring-shaped seal onto an edge forming the one connection opening, such that the ring-shaped seal, which is positioned to extend from an exterior of the distribution and collection device to an interior of the distribution and collection device, has an outer diameter greater that the inner diameter of the one connection opening. Moreover, the process includes positioning the ring-shaped seal into the circumferential groove in a tensioned state.

According to a feature of the invention, the ring-shaped seal may be positioned in the circumferential groove by moving the pipe piece in a direction axially outwardly relative to the one connection opening. Further, the pipe piece can include a conical section arranged such that a largest diameter of the conical section is adjacent the circumferential groove, and, before being positioned in the circumferential groove, an inner surface of the ring-shaped seal can slide over at least a portion of the conical section as the pipe piece is moved axially outwardly.

According to another feature of the invention, the pipe piece may be connected to a connection support of the hydrocyclone. Moreover, the pipe piece can be screwably fixed and removed from the connection support of the hydrocyclone via a sleeve having right-hand and left-hand threads. Alternatively, the pipe piece can be a connection support of the hydrocyclone.

In accordance with yet another feature of the present invention, the process can also include applying an axial force, from the outside of the distribution and collection device, to compress the ring-shaped seal.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 3a–3c illustrate three exemplary states in the mounting of the connection device;

FIGS. 4 and 5 illustrate partially sectioned top views of variant embodiments of the connection device;

FIGS. 6 and 7 illustrate the connection of hydrocyclones to two variant embodiments of distribution and collection device;

FIG. 11 illustrates an alternative embodiment to the that depicted in FIG. 5;

FIGS. 12 and 13 illustrate the connection of hydrocyclones to the two variant embodiments of distribution and collection device depicted in FIGS. 6 and 7.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
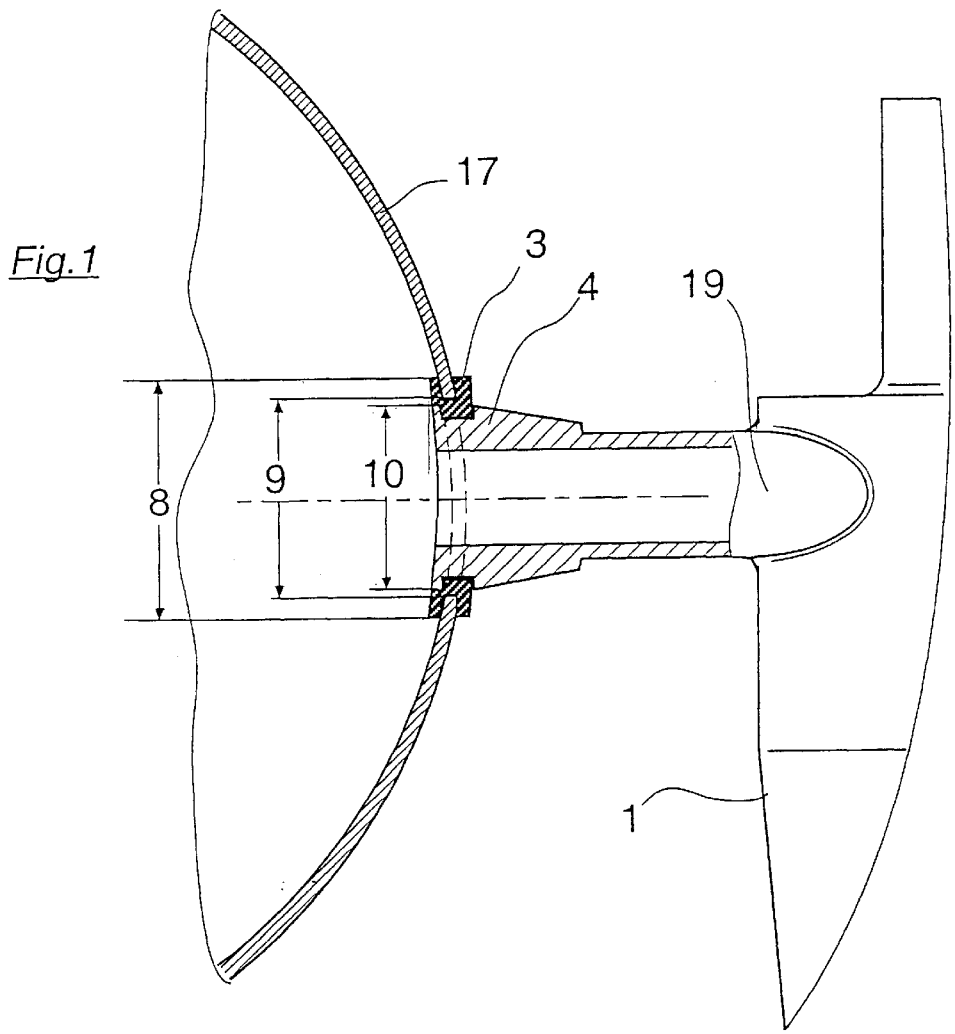
FIG. 1 illustrates an exemplary embodiment of a side section view of a connection structured in accordance with the features of the invention.
Figure 2:
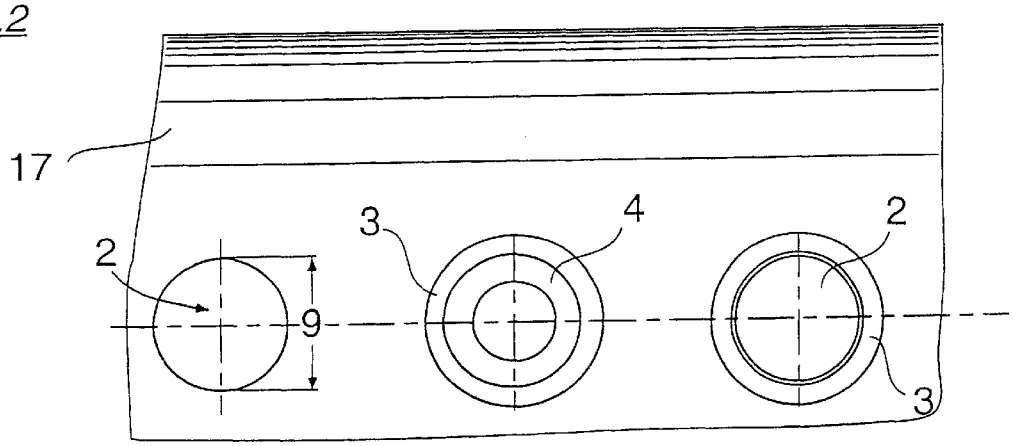
FIG. 2 illustrates a view of an interior of a supply pipe to the connection device.

FIG. 1 shows the completely assembled connection of hydrocyclone 1 to a supply pipe 17 with the aid of a connection device structured in accordance with the features of the instant invention. Pipe 17 comprises a portion of a distribution and collection device. FIG. 2 shows a simplified view of an interior of supply pipe 17 in which three connection openings 2 are depicted, as view from the inside. The left most connection opening 2 is depicted without a connection device coupled thereto. In FIG. 1, seal 3 is depicted in its mounted position, i.e., placed in connection opening 2, so that it extends from an exterior into an interior of the distribution and collection device, i.e., supply pipe 17. According to the features of the instant invention, seal 3 is tensed, whereby a secure hold of the entire connection unit in connection opening 2 is ensured, and such that it cannot even be pushed out under interior pressure in supply pipe 17. Further details of the connection, e.g., relative diameters 8, 9, and 10, are discussed hereinbelow with reference to FIGS. 3a–3c.

According to an exemplary embodiment of the invention, pipe piece 4 can be simultaneously utilized (or formed) as a connection support 19 of hydrocyclone 1. In this manner, connection costs can be reduced and assembly may be simplified. Such a direct connection is also conceivable in the other embodiments of the seal region. However, pipe piece 4 can also have a tube nipple 29, as illustrated in FIG. 4, if the event that a tube connection to the hydrocyclone is to be produced.

The right most connection opening depicted in FIG. 2 shows the insertion and positioning of seal 3 in connection opening 2 before pipe piece 4 is inserted through seal 3 so as to be connected to supply pipe 17, as depicted in the center connection opening of FIG. 2.

FIG. 3a shows the connection at a beginning of an assembly procedure, i.e., in a state in which an insertion end of pipe piece 4 has already been inserted through connection opening 2. In this regard, it is noted that this manner of connection can be very simply possible performed from outside of supply tube 17, because outer diameter 10 of a radial protrusion 6 of pipe piece 4 is smaller than an inner diameter 9 of connection opening 2. Moreover, a bevel 15 (see FIG. 3b) on the insertion end of pipe piece 4 can be provided facilitate insertion and to produce a better flow inlet.

On an outer diameter of seal 3, a circumferential groove 14 is located having base positioned at a diameter that is approximately as large as inner diameter 9 of connection opening 2. Seal 3 has an outer diameter 8 that is, e.g., a few millimeters larger than inner diameter 9, but, because it is elastic, can also be inserted, from outside of supply pipe 17 in an assembly direction depicted by arrow 18, as shown in FIG. 3b, so that the portion of the wall of supply pipe 17 defining connection opening 2 is accepted within groove 14. Next, pipe piece 4 can be now moved back, i.e., outwardly from supply pipe 17 in an assembly direction depicted by arrow 18', so that an inner diameter of seal 3 slides along an outer cone portion 20 of pipe piece 4, as shown in FIG. 3c, until it is locked into groove 5.

The distribution and collection device often contains a number of pipes to guide media. One such pipe can be, e.g., a round inlet pipe, such as supply pipe 17. In such a case, the edges of connection openings 2 form spatial curves. Therefore, it may be necessary to also work groove 5 into pipe piece 4 in a spatial manner, i.e., not running evenly around the circumference. The same is true for the insertion-side connection of pipe piece 4 if disruptive edges in the inlet pipe are to be prevented. In an injection molding process, it is to be produced in any case. FIGS. 1, 4, and 11 show such exemplary embodiments.

However, according to the state of the geometric relationships at this insertion point, it can also be sufficient according to FIG. 5 to provide pipe piece 4' with a groove 5' that is also circumferential and also to make pipe piece 4' rotationally symmetrical. The condition for this is that the elastic deformability of seal 3' is sufficiently large that a sufficiently even force for the application can be produced over the entire circumference of pipe piece 4'. This can be a particularly simple embodiment. However, which of the cited solutions is most favorable in a particular situation depends on the pressures of operation. Generally, the operating pressure at the inlet into the hydrocyclone is substantially higher than at the outlets.

FIGS. 6 and 7 show two typical possibilities for connecting hydrocyclones to a distribution and collection device. As shown in FIG. 6, two pipes can be arranged to lie parallel to one another, such that inlet pipe 17 can be located below accepted stock pipe 22. Hydrocyclones 1 are hydraulically connected to these pipes and additionally fixed to them by a holder 28, which is only schematically depicted. As is known, hydrocyclones are used to remove the heavy particles from a suspension, for which purpose a rejects opening 23 is located at the lower end.

FIG. 7 shows another connection possibility in which the distribution and collection device is formed by a vertically oriented pipe having a separating plate 25 arranged to separate the accepted stock part (above plate 25) from the inlet part (below plate 25). The connection according to the present invention can be made in all connections by way of which hydrocyclone 1 is connected to the distribution and collection device. This is especially shown in FIG. 7 in that even rejects opening 23 is connected to rejects line 24 in a manner according to the instant invention. Connections to the hydrocyclones are made by tubes 12.

Figure 8:
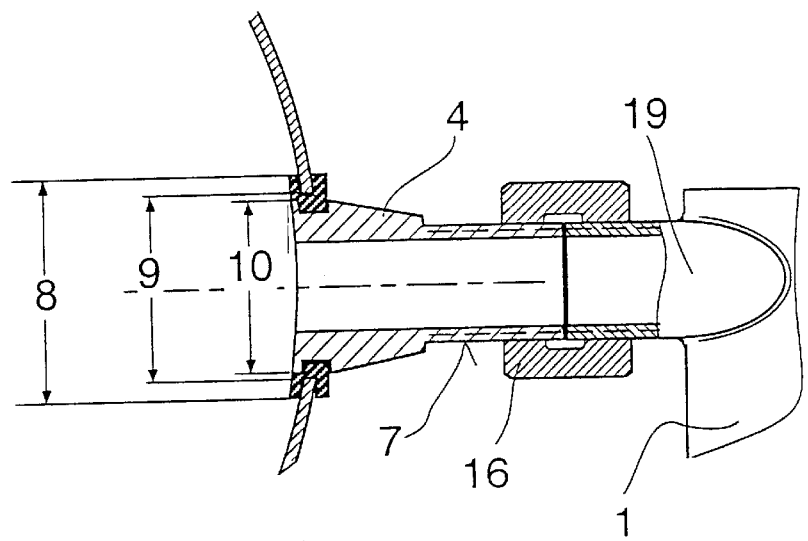
FIG. 8 illustrates a modified embodiment of the connection of the hydrocyclone.

In the example shown in FIG. 8, pipe piece 4 is not a part of hydrocyclone 1, but instead carries a thread 7 for a sleeve 16. Sleeve 16 contains two inner threads with different rotational directions, i.e., left-hand and right-hand threads, such that connection support 19 of hydrocyclone 1, which is also provided with a thread, can be screwed onto the connection unit and, naturally, may also be unscrewed again, if necessary.

Figure 9:
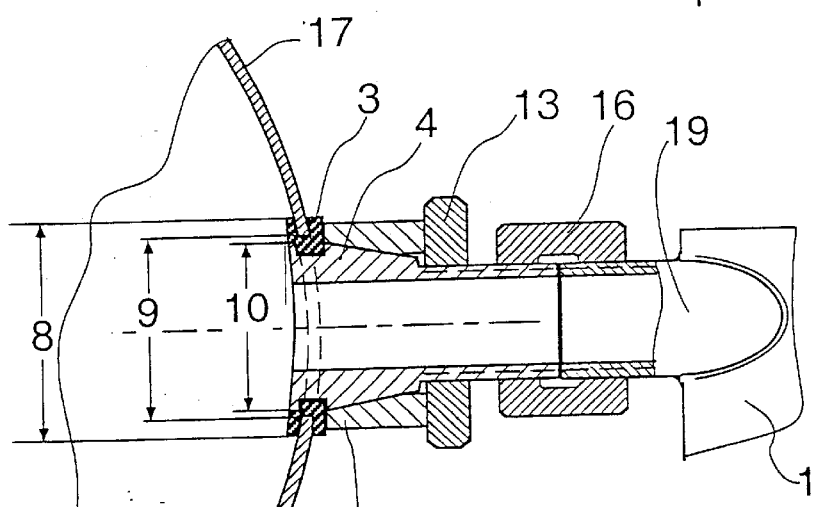
FIG. 9 illustrates a connection including forcing nuts for axially tensing the seal.

FIG. 9 shows a completely assembled connection of the hydrocyclone in which an additional axial force for tensing the seal 3 is produced. The seal 3 can be seen in its mounted position, i.e., inserted in the connection opening 2. It extends from the exterior into the interior of the distribution and collection device, i.e., here, the inlet pipe 17. On its end protruding outwards, the pie piece 4 carries a thread with a forcing nut 13, which exerts a constant axial force on the seal 3 by way of a pressure component 27 when the forcing nut 13 is tightened. This axial force presses seal 3 and thus ensures an even firmer hold of the entire connection in connection opening 2. In this manner, it cannot be pressed out even in the case of strong inner pressure in inlet pipe 17. A more detailed view of the embodiment of FIG. 9 is illustrated in FIG. 11.

In the example shown, the thread is sufficiently extended for forcing nut 13 and the corresponding part of pipe piece 4 that a sleeve 16 can run on the same thread. In this regard, sleeve 16 corresponds to that depicted in FIG. 8.

Figure 10:
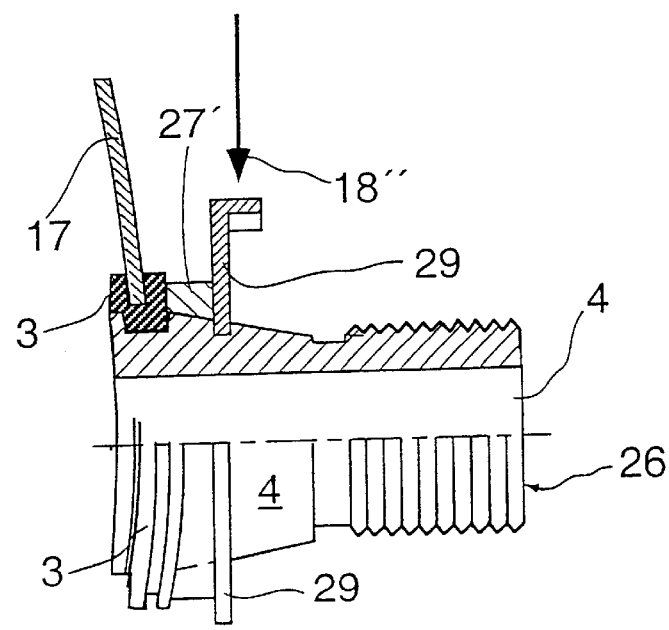
FIG. 10 illustrates a connection including clamps for axially tensing the seal.

There are various possibilities for exerting the necessary axial force on seal 3. Besides the threading with the aid of a forcing nut 13 shown in FIG. 9, a clamp 29 can be inserted into a corresponding groove of pipe piece 4 in a radial assembly direction according to arrow 18", as illustrated in FIG. 10, in a position so that seal 3 is axially prestressed such that a constant axial force ensues. However, it is also conceivable to use a springed pressure component 27' and to prestress it accordingly. Thus, a sufficient and constant axial force can even be ensured in the case of the position of clamps 29, which is no longer axially displaceable. Here, a tube nipple 26 is provided for connection to the hydrocyclone, which is not limited to this embodiment. It depends on the construction situation and the operational pressures whether a tube connection to the hydrocyclone is advisable.

FIGS. 12 and 13 show possibilities for connecting hydrocyclones to a distribution and collection device with the aid of the forcing nuts 13 as described, e.g., with respect to FIGS. 9 and 11. In this regard, FIGS. 12 and 13 depicted distinct arrangements for connecting the hydrocyclone to the distribution and collection device. In FIG. 12, two pipes are horizontally arranged parallel to one another and, in FIG. 13, a vertical orientation is utilized. Again, hydrocyclones remove the heavy particles from one suspension, for which purpose a reject opening 23 is located on the lower end.

In this embodiment, the hydrocyclones are fastened to the distribution and collection device without any other holders because the connection according to the invention offers sufficient support. This can be expected especially when connection devices according to FIGS. 9, 10, and 11 are used.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A connection device for connecting a hydrocyclone to a distribution and collection device for addition or removal of liquids, in which the distribution and collection device includes connection openings through which the addition or removal of the liquid occurs during operation of the hydrocyclone, the connection device comprising:
    a pipe piece having an insertion side structured and arranged to be insertable through one of the connection openings into the distribution and collection device;
    said insertion side comprising a circumferential groove and a radial protrusion positioned adjacent said circumferential groove;
    said radial protrusion having an outer diameter smaller than an inner diameter of the one connection opening and being structured to remain within the distribution and collection device;
    a ring-shaped seal, structured and arranged to extend from an exterior of the distribution and collection device to an interior of the distribution and collection device, having an outer diameter greater that the inner diameter of the one connection opening; and
    said ring-shaped seal being positionable in a tensioned state in said circumferential groove.

2. The connection device in accordance with claim 1, wherein said pipe piece includes a conical section whose largest diameter is adjacent to said circumferential groove.

3. The connection device in accordance with claim 2, wherein the largest diameter of said conical section is at least about 4 mm greater than a diameter of said circumferential groove.

4. The connection device in accordance with claim 1, wherein said outer diameter of said radial protrusion is at least about 6 mm larger than a diameter of said circumferential groove.

5. The connection device in accordance with claim 1, wherein said outer diameter of said radial protrusion is a maximum of about 2 mm smaller than said inner diameter of the one connection opening.

6. The connection device in accordance with claim 1, wherein said radial protrusion includes a beveled surface arranged for facilitating insertion into the one connection opening.

7. The connection device in accordance with claim 1, wherein said pipe piece is a part of the hydrocyclone to be attached.

8. The connection device in accordance with claim 1, wherein said pipe piece includes a tube nipple.

9. The connection device in accordance with claim 1, further comprising a clamp, and said pipe piece including a clamp groove arranged to receive said clamp,
    wherein said clamp is insertable within said clamp groove and is arranged to one of directly or indirectly apply an axial force onto said ring-shaped seal.

10. The connection device in accordance with claim 1, wherein said pipe piece is connectable to a connection support of the hydrocyclone to be connected via a screw connection.

11. The connection device in accordance with claim 10, wherein a sleeve having a left-hand and a right-hand thread provides a rotatably fixable and removable screw connection between said pipe piece and the connection support of the hydrocyclone to be connected.

12. The connection device in accordance with claim 1, wherein the at one connection opening has an uneven edge, said circumferential groove in said pipe piece is evenly formed, and said ring-shaped seal is structured to compensate for deviations between said evenly formed groove and said uneven edge of the one connection opening.

13. The connection device in accordance with claim 12, wherein said ring-shaped seal comprises an elastic deformable material, whereby the elastic deformable material of said ring-shaped seal provides the compensation for deviations.

14. A connection device for connecting a hydrocyclone to a distribution and collection device for addition or removal of liquids, in which the distribution and collection device includes connection openings through which the addition or removal of the liquid occurs during operation of the hydrocyclone, the connection device comprising:
    a pipe piece having an insertion side structured and arranged to be insertable through one of the connection openings into the distribution and collection device;
    said insertion side comprising a circumferential groove and a radial protrusion positioned adjacent said circumferential groove;
    said radial protrusion having an outer diameter smaller than an inner diameter of the one connection opening and being structured to remain within the distribution and collection device;
    a ring-shaped seal, structured and arranged to extend from an exterior of the distribution and collection device to an interior of the distribution and collection device, having an outer diameter greater that the inner diameter of the one connection opening;
    said ring-shaped seal being positionable in a tensioned state in said circumferential groove;
    a pressure component positioned outside of the distribution and collection device that is structured and arranged exert a force to axially compress said ring-shaped seal.

15. The connection device in accordance with claim 14, further comprising a tension device arranged to exert an axial force on said pressure component, whereby a constant force is applied between said radial protrusion and said pressure component which axially compresses the seal.

16. The connection device in accordance with claim 15, wherein said tension device comprises a forcing nut, and said pipe piece includes a thread, such that as said forcing nut is screwably tightened against said pressure component, axial compression of said ring-shaped seal occurs.

17. The connection device in accordance with claim 16, wherein said pressure component is formed as a part of said forcing nut.

18. A connection device for connecting a hydrocyclone to a distribution and collection device for addition or removal of liquids, in which the distribution and collection device includes connection openings through which the addition or removal of the liquid occurs during operation of the hydrocyclone, the connection device comprising:
   a pipe piece having an insertion side structured and arranged to be insertable through one of the connection openings into the distribution and collection device;
   said insertion side comprising a circumferential groove and a radial protrusion positioned adjacent said circumferential groove;
   said radial protrusion having an outer diameter smaller than an inner diameter of the one connection opening and being structured to remain within the distribution and collection device;
   a ring-shaped seal, structured and arranged to extend from an exterior of the distribution and collection device to an interior of the distribution and collection device, having an outer diameter greater that the inner diameter of the one connection opening;
   said ring-shaped seal being positionable in a tensioned state in said circumferential groove;
   a pressure component arranged to axially compress said ring-shaped seal; and
   a forcing nut arranged to axially compress said pressure component,
   wherein said pressure component is formed as a part of said forcing nut.

19. A process for connecting a distribution and collection device to a hydrocyclone, in which the distribution and collection device includes a number of connection openings, the process comprising:
   inserting an insertion side of a pipe piece through one of the connection openings into the distribution and collection device, wherein the insertion side of the pipe piece includes a circumferential groove and a radial protrusion, positioned adjacent the circumferential groove, that has an outer diameter smaller than an inner diameter of the one connection opening;
   positioning a ring-shaped seal onto an edge forming the one connection opening, wherein the ring-shaped seal, which is positioned to extend from an exterior of the distribution and collection device to an interior of the distribution and collection device, has an outer diameter greater that the inner diameter of the one connection opening; and
   positioning the ring-shaped seal into the circumferential groove in a tensioned state.

20. The process in accordance with claim 19, wherein the ring-shaped seal is positioned in the circumferential groove by moving the pipe piece in a direction axially outwardly relative to the one connection opening.

21. The process in accordance with claim 20, wherein the pipe piece includes a conical section arranged such that a largest diameter of the conical section is adjacent the circumferential groove, and, before being positioned in the circumferential groove, an inner surface of the ring-shaped seal slides over at least a portion of the conical section as the pipe piece is moved axially outwardly.

22. The process in accordance with claim 19, wherein said pipe piece is connected to a connection support of the hydrocyclone.

23. The process in accordance with claim 22, wherein said pipe piece is screwably fixed and removed from the connection support of the hydrocyclone via a sleeve having right-hand and left-hand threads.

24. The process in accordance with claim 19, wherein said pipe piece is a connection support of the hydrocyclone.

25. A The process a distribution and collection device to a hydrocyclone, in which the distribution and collection device includes a number of connection openings, the process comprising:
   inserting an insertion side of a pipe piece through one of the connection openings into the distribution and collection device, wherein the insertion side of the pipe piece includes a circumferential groove and a radial protrusion, positioned adjacent the circumferential groove, that has an outer diameter smaller than an inner diameter of the one connection opening;
   positioning a ring-shaped seal onto an edge forming the one connection opening, wherein the ring-shaped seal, which is positioned to extend from an exterior of the distribution and collection device to an interior of the distribution and collection device, has an outer diameter greater that the inner diameter of the one connection opening; and
   positioning the ring-shaped seal into the circumferential groove in a tensioned state; and
   applying an axial force, from the outside of the distribution and collection device, to compress the ring-shaped seal.

* * * * *